United States Patent [19]
Gauthier et al.

[11] Patent Number: 5,760,914
[45] Date of Patent: Jun. 2, 1998

[54] IMAGE REGISTRATION METHOD

[75] Inventors: Forrest P. Gauthier, Maineville; Dimitrije L. Jovic, Cincinnati, both of Ohio

[73] Assignee: Varis Corporation, Mason, Ohio

[21] Appl. No.: 669,912

[22] Filed: Jun. 25, 1996

[51] Int. Cl.$^6$ .............. H04N 1/40; H04N 1/00; G06F 15/00; G06K 9/32
[52] U.S. Cl. .............. 358/298; 358/406; 395/109; 382/293
[58] Field of Search .................. 358/296, 298, 358/400, 401, 406, 500, 501, 504; 395/101, 109, 111, 112, 114–116; 382/254, 276, 286, 287, 289, 290, 293–295

[56] References Cited

U.S. PATENT DOCUMENTS

| | | | |
|---|---|---|---|
| 4,814,792 | 3/1989 | Yamanobe et al. | 346/108 |
| 4,839,674 | 6/1989 | Hanagata et al. | 346/136 |
| 4,878,110 | 10/1989 | Maruyama et al. | 358/75 |
| 5,199,101 | 3/1993 | Cusick et al. | 395/115 |
| 5,257,325 | 10/1993 | Casparian et al. | 382/44 |
| 5,309,558 | 5/1994 | Rourke et al. | 395/166 |
| 5,319,550 | 6/1994 | Griffith | 364/413 |
| 5,321,434 | 6/1994 | Strauch et al. | 346/108 |
| 5,384,886 | 1/1995 | Rourke | 395/147 |
| 5,434,956 | 7/1995 | Son et al. | 395/105 |
| 5,450,537 | 9/1995 | Hirai et al. | 395/149 |
| 5,455,603 | 10/1995 | Hori et al. | 346/134 |
| 5,471,562 | 11/1995 | Shibata et al. | 395/101 |

*Primary Examiner*—Eric Frahm
*Attorney, Agent, or Firm*—Thompson Hine & Flory LLP

[57] ABSTRACT

An electronic image registration method for use with a high-speed raster printer controller provides run-time registration of an image which is defined by a continuous stream of rasterized bit-map data. The method includes the steps of: (a) detecting a misalignment of the image with respect to a form, and producing a registration value in response to the detected misalignment; (b) acquiring a present block of the bit-map data from the stream; (c) shifting the present block of the bit-map data a number of bits according to a shift count generated from the registration value produced in step (a) to create a present contiguous set of shifted bit-map data bits and a present contiguous set of spill-over bit-map data bits; (d) storing the present set of spill-over bits; (e) combining the present set of shifted bits with a previous contiguous set of spill-over bit-map data bits to create a present registered block of bit-map data; and (e) dispatching the present registered block to a print engine. The method preferably operates in hardware positioned between the rendering section of the raster printer controller and the print engine, thus allowing the registration to be performed in real-time without slowing the raster printer controller's processing speeds.

26 Claims, 7 Drawing Sheets

FIG. 6A – FDIN (98): PIXEL 1, PIXEL 2, PIXEL 3, PIXEL 4, PIXEL 5, PIXEL 6, PIXEL 7, PIXEL 8, PIXEL 9, PIXEL 10, PIXEL 11, PIXEL 12, PIXEL 13, PIXEL 14, PIXEL 15, PIXEL 16

FIG. 6B – FSHFT (100): PIXEL 14, PIXEL 15, PIXEL 16, PIXEL 1, PIXEL 2, PIXEL 3, PIXEL 4, PIXEL 5, PIXEL 6, PIXEL 7, PIXEL 8, PIXEL 9, PIXEL 10, PIXEL 11, PIXEL 12, PIXEL 13 {112}

FIG. 6C – SPILL_PX (118): PIXEL 14, PIXEL 15, PIXEL 16, 0, 0, 0, 0, 0, 0, 0, 0, 0, 0, 0, 0, 0 {112}

FIG. 6D – SHFT_PX (120): 0, 0, 0, PIXEL 1, PIXEL 2, PIXEL 3, PIXEL 4, PIXEL 5, PIXEL 6, PIXEL 7, PIXEL 8, PIXEL 9, PIXEL 10, PIXEL 11, PIXEL 12, PIXEL 13 {114}

FIG. 6E – DHIST (126): OLD PIXEL 14, OLD PIXEL 15, OLD PIXEL 16, 0, 0, 0, 0, 0, 0, 0, 0, 0, 0, 0, 0, 0 {112'}

FIG. 6F – QIN (128): OLD PIXEL 14, OLD PIXEL 15, OLD PIXEL 16, PIXEL 1, PIXEL 2, PIXEL 3, PIXEL 4, PIXEL 5, PIXEL 6, PIXEL 7, PIXEL 8, PIXEL 9, PIXEL 10, PIXEL 11, PIXEL 12, PIXEL 13

IMAGE REGISTRATION METHOD

BACKGROUND

The present invention relates to an electronic image registration system for a high-speed printer controller, and more particularly, to a dedicated hardware architecture for performing registration on an image in the form of a continuous stream of rasterized bit-map data. This registration is performed independently of page description language ("PDL") decoding and image rendering operations performed by the printer controller's graphics processing units.

The printing industry has advanced to the point that printing capabilities are no longer limited by the print engine speeds, but rather by the amount of processing time required by the printer controllers. Furthermore, as the printer controllers move into the field of variable data printing, in which each page map shares a common background or "template", and at least one set of image data bits changes for each page, the processing and dispatching times of such page-maps become increasingly significant. Therefore, for such printer controllers, it is imperative that the softwaredriven processing units on these printer controller boards have limited and specialized functions such that the PDL decoding, image processing and bit-map transport operations are performed as quickly and as efficiently as possible.

Therefore, on raster printer controller boards such as these, it is desirable to divide the controller architecture into a number of functional sections where each section is controlled by a dedicated microprocessor, operating in a pipeline fashion, and where each processing section is responsible for a specific functional operation of the raster printer controller.

High-speed printers utilizing these raster printer controllers can be configured to print variable image data on a predefined portion of a pre-printed form, i.e., printing customer addresses on a portion of a mass-mailing advertisement. As these forms are being printed, it is not uncommon that the printed images become misaligned with respect to the area in which they are to be printed on the form. Therefore, an image registration system is required to align or "register" the image with respect to this area on the form in real time. This misalignment of the image can be caused by circumstances such as the paper stretching or deforming, changes in the sizes of paper being used, etc.

One known method of registering the image with the pre-printed form is to mechanically shift the paper or mechanically shift the printing apparatus during the print job such that the image is aligned with the paper. Disadvantages with registering a print job in such a manner are that the mechanical registration can be complicated, imprecise and unreliable.

Another typical method for registering the image with the pre-printed form is to have the rendering units (the processing units which decode the PDL data and build the bit-map of the image from the decoded PDL data) on the printer controller render each image separately, incorporating the registration requirements in each rendering operation. A disadvantage with this method is that it significantly increases the complexity of the rendering operations and thus significantly slows the processing speeds of the rendering units, and in turn, of the printer controller.

Yet another known method for horizontally registering the image with the preprinted form is to buffer a complete scan-line of the rendered bit-map data in memory and then shift the image as necessary. A disadvantage of this method is that it requires sufficient memory to hold an entire scan-line.

Thus, it is desirable to have a registration system which is performed electronically by the raster printer controller system; which is performed independently of the decoding and rendering operations of the controller board; which requires a significantly small amount of memory; and which is also substantially software independent, resulting in a very fast and reliable real-time registration operation.

SUMMARY OF THE INVENTION

The present invention is an electronic image registration system for a highspeed raster printer controller which comprises dedicated hardware for performing run-time registration, in both the horizontal and vertical directions, on a continuous stream of rasterized bit-map data generated by the rendering units of the raster printer controller. The registration takes place in hardware, between the rendering section of the controller and the print engine, thus allowing the registration to be performed in real-time without slowing the controller's processing speeds.

The dedicated run-time electronic-image registration hardware for the vertical registration of the image comprises a vertical holding register and a vertical counter. The vertical holding register is loaded by a microprocessor and indicates the magnitude of the vertical registration, which in turn indicates a length of delay in scanline units before the start of the page-map's print cycle after seeing a "top-of-form" signal from the print engine.

The dedicated run-time electronic-image registration hardware for the horizontal registration of the image comprises a barrel-shifter, a data bus coupled to the input port of the barrel-shifter for transmitting the data stream to the barrel-shifter one block of scan-line data at a time, a history (spill-over) register coupled to the output of the barrel-shifter, and a logical adding device having a first addend input port coupled to the output port of the barrel-shifter and a second addend input port coupled to the output port of the history register.

The horizontal and vertical registration systems act upon the current value stored in the horizontal and vertical holding registers. These holding registers are accessible by the CPU via a CPU data bus. These holding registers can be updated by the CPU with new values anytime during run-time operations in response to, for example, an operator activating cursor keys on an operator input device. The operator may be activating the cursor keys on the operator input to align the printed images with respect to a pre-printed form during a production run. Alternatively the horizontal and vertical holding registers could be modified in response to any automated sensing means as is known in the art.

The value of the data in the horizontal holding register is preferably a two's complement binary number indicating the magnitude and direction of the horizontal movement of the image across the width of the printed page (or otherwise referred to as the horizontal registration). Therefore if this value is positive, the horizontal registration will occur in one direction, and if this value is negative, the horizontal registration will occur in the opposite direction.

The horizontal registration operation involves loading a present block of the scan-line data into the barrel-shifter, barrel-shifting the present block a number of bits corresponding to a pre-determined shift count which is derived from the value of the data in the horizontal holding register, isolating the present shifted block of bit-map data and the present spill-over block of bit-map data, transferring the present shifted block to one of the addend inputs of the adding device and transferring the present spill-over block to the history (spill-over) register. The transfer of the present spill-over block to the history register causes the history register to output a previous spill-over block to the other addend input of the adding device; the previous spill-over block being generated by the barrel-shifting and isolating operations performed on the previous block of scan-line data. Thus, the adding device adds the present shifted block to the previous spill-over block to create a present registered block of bit-map data (pixel shifted and aligned) which is sent to the fiber-optic output port for dispatch to the print engine.

The same operation is performed on the next block of scan-line data received by the registration device. Therefore, the next registered block will comprise the sum of this next shifted block of bit-map data with the present spill-over block of bit-map data generated above. Preferably, these steps are repeated for an entire scan-line of the bit-map data.

The predetermined shift count is taken from the "N" least significant bits of the horizontal holding register (the "SHIFT bit-slice") where $2_N$ represents the data width size of the barrel-shifter. If the magnitude of the horizontal registration is greater than the data width size of the barrel-shifter, then the horizontal registration system will either pad entire blocks of null-pixels to the beginning of the scan-line or clip entire blocks of pixels from the beginning of the scan-line, depending upon the polarity of the horizontal holding register. The number of pixel blocks to pad or clip to or from the beginning of the scan-line depends upon the magnitude of a MULT bit-slice taken from of the horizontal holding register. The MULT bit-slice comprises the set of bits in the horizontal holding register between the most significant bit of the horizontal holding register and the SHIFT bit-slice. Therefore if the magnitude of the data value in the horizontal holding register is less than the data width size of the barrel-shifter, then the MULT bit-slice will either be all zeros (if the value in the horizontal holding register is positive) or all ones (if the value in the horizontal holding register is negative), and the horizontal registration circuitry will not pad or clip blocks of pixels to or from the beginning of the scan-line. However, if the MULT bit-slice is greater than zero for a positive value in the horizontal holding register or less than seven (MULT bit-slice does not contain all ones -- assuming that the MULT bit-slice is three bits wide) for a negative value in the horizontal holding register, then the horizontal registration circuitry will pad or clip blocks to or from the beginning of the scan-line depending upon the value of the MULT bit-slice.

Once the appropriate number of pixel blocks is padded to or clipped from the beginning of the scan-line, the horizontal registration operation can begin performing the shifting, isolating and adding operations on the scan-line blocks as described above. Finally, if NULL pixels were padded to the beginning of the scan-line, then an identical number of pixels will need to be clipped from the end of the scan-line; and if pixels were clipped from the beginning of the scan-line, then an identical number of NULL pixels will need to be padded to the end of the scan-line.

Therefore, by utilizing a barrel-shifter and history register in this manner, no additional memory is required for the horizontal registration operation (only $_2N+1$ bits of memory are required by this circuit) independent of the data width of the scan-line. Thus, architecturally, this design can be incorporated into a generic raster printer controller that can drive a multitude of printers without regard to the printers' individual scan-line width requirements. Additionally, the horizontal registration operation is performed in real-time, without necessitating any additional processing during the decoding or rendering operations. The horizontal registration circuitry is also significantly simplified by the use of a two's-complement binary value in the horizontal holding register; since the barrel-shifter will always shift right irrespective of the direction of registration (i.e., irrespective of the polarity of the value of the horizontal holding register).

Accordingly it is an object of the present invention to provide an electronic registration system which operates on-the-fly, in real-time, independently of the decoding and rendering operations of the controller; which requires a significantly small amount of memory; and which is also designed to be substantially software independent, resulting in a very fast and reliable real-time registration operation.

It is another object of the present invention to provide a method for registering an image, which is defined by a continuous stream of rasterized bit-map data, where the method includes the steps of: (a) detecting a misalignment of the image with respect to a form, and producing a registration value in response to the detected misalignment; (b) acquiring a present block of the bit-map data from the stream; (c) shifting the present block of the bit-map data a number of bits according to a shift count generated from the registration value produced in step (a) to create a present contiguous set of shifted bit-map data bits and a present contiguous set of spill-over bit-map data bits; (d) storing the present set of spill-over bits; (e) combining the present set of shifted bits with a previous contiguous set of spill-over bit-map data bits to create a present registered block of bitmap data; and (e) dispatching the present registered block to a print engine.

These and other objects and advantages of the present invention will become apparent from the following description, the accompanying drawings and the appended claims.

BRIEF DESCRIPTION OF THE DRAWINGS

FIGS. 6A-6F depict a table representation of pixels sent through progressive stages of the horizontal registration circuitry;

DETAILED DESCRIPTION

The present invention provides an on-the-fly, run-time, electronic image registration system for a high-speed raster printer controller.

Figure 1:
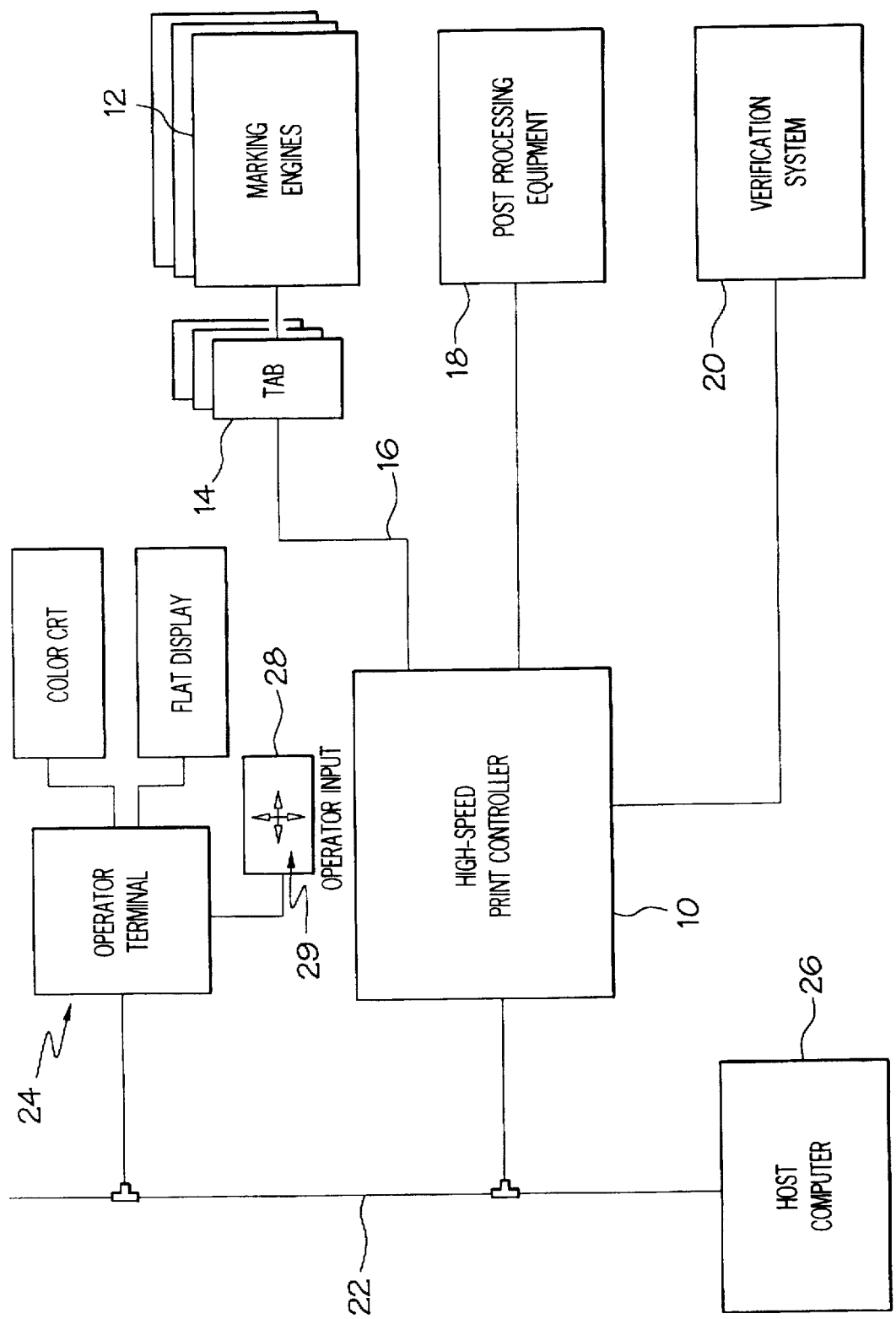
FIG. 1 is a block diagram of a high-speed printing operation for utilizing the present invention.

As shown in FIG. 1, a typical high-speed printing operation for utilizing the present invention includes a high-speed raster printer controller 10, for interpreting a PDL file and for sending rasterized page-maps or page-map blocks of an image defined by the PDL file to at least one raster marking engine 12. The high-speed raster printer controller 10 communicates with the marking engine 12 through a target adapter board 14 ("TAB"). The high-speed raster printer controller 10 is preferably a universal printer controller, while the TAB 14 is a custom designed circuit board for translating the rasterized bit-map data stream generated by the high-speed printer controller 10 to be acceptable by the various marking engines 12. The TAB is situated between the high-speed raster printer controller 10 and the marking engines 12 on a data bus, such as a fiber optic data link 16. The high-speed raster printer controller 10 may also have outputs to post-processing equipment 18 and verification systems 20.

The high-speed printing operation utilizing this high-speed raster printer controller 10 can be configured to print variable image data onto a pre-defined portion of a pre-printed form, i.e., printing customer addresses on a portion of a mass mailing advertisement. This high-speed printing system has a communications link, such as an Ethernet communications link 22 set up between a operator terminal 24 and a host computer 26. The host computer 26 provides the files that contain the data which is used by the high-speed printing system during the printing operation.

The images generated by this high-speed printing operation may be variable images which are to be applied to a pre-defined portion of a pre-printed form, i.e., printing customer addresses on a address portion of a mass mailing advertisement, or printing a serial number or bar code in a precise location on the packaging of the printer operator's merchandise. As these variable images are being applied to the pre-printed forms or packaging, these images may become misaligned with respect to the particular area to which they are to be printed on the pre-printed forms. Upon observing this, the operator will indicate on the operator input pad 28 the directions and distances (both horizontal and vertical) of image registration required. Because the present invention provides real-time image registration, the operator will see substantially immediate movement of the image with respect to the form as the operator is hitting the cursor keys 29 (or other input devices) on the operator input panel 28. Therefore, the operator will merely need to observe the printed output while hitting the appropriate keys on the operator input panel to immediately register the image with respect to the pre-printed form. Of course, it will be apparent to one of ordinary skill in the art that many types of known detecting and control systems can also be used to perform the function of the operator as described above.

Figure 2:
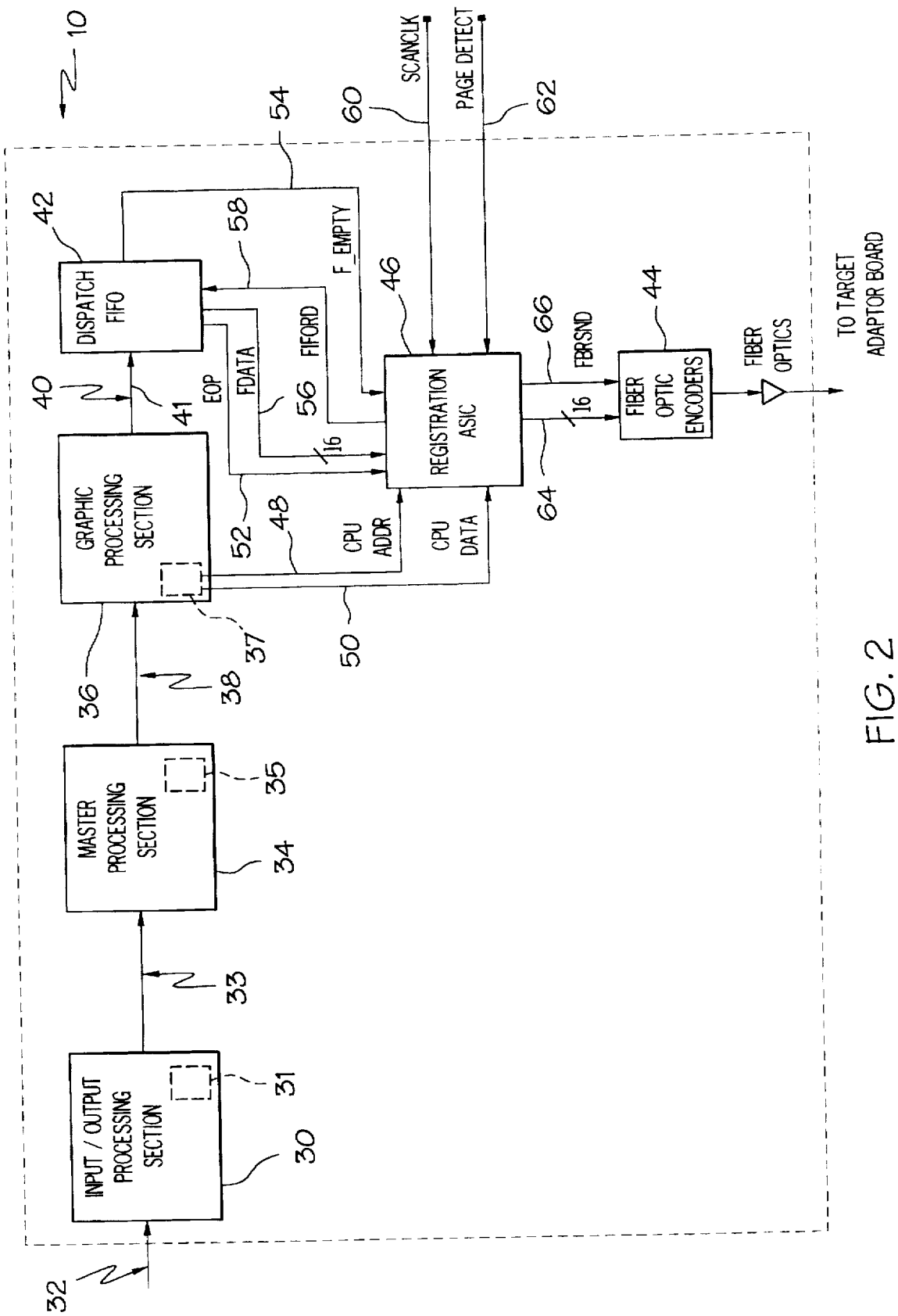
FIG. 2 is a block diagram of a high-speed printer controller incorporating the present invention.

As shown in FIG. 2, the high-speed raster printer controller 10 has a series of processing sections operating in a pipeline, parallel fashion. The processing sections divide the interpreting, rendering and dispatching functions of the controller, thereby accelerating the processing and dispatching of the page-maps generated thereon. The processing units controlling the particular processing sections utilize realtime/multi-tasking software which operates asynchronously of the software in the other processing units.

The first processing section in the pipeline is an input/output processing section or ("IOPS") 30 controlled by an input/output processing unit ("IOP") 31. This processing section controls the input and output of data for the print operation. As shown in FIGS. 1 and 2, the IOPS 30 receives a data stream 32 from the host computer 26 via the Ethernet communications link 22. The data stream 32 contains the page description language ("PDL") program, and any other commands and/or signals sent from the operator terminal 24. The IOPS 30 is connected to a main processing section or ("MPS") 34, controlled by a main processing unit ("MPU") 35, which is responsible for controlling the interpreting operations of the PDL datastream. The MPS 34 processes and interprets the PDL datastream 33 to identify objects such as text characters and symbols, and to obtain information regarding the graphic state or processing environment in which the objects are to be rendered, such the current font being used, and the current scale and rotation to be applied. As a result of processing and interpreting the page description language, the MPS 34 generates rendering commands 38 which designate the object to be rendered, the graphic state to be applied, and the offset address at which the rendered object is to be placed onto the page-map. A graphics processing section ("GPS") 36, controlled by a graphics processing unit ("GPU") 37, coupled to the MPS 34, renders the bit-maps of the image in accordance to the rendering commands generated by the MPS 34 and in accordance with the graphic states and attributes specified in the commands in a conventional manner. The GPS 36 can also be configured to merge variable data taken from a merge file into pre-ripped template images. The rendered or merged bitmaps 40 are dispatched from the GPS to the dispatch FIFO(s) 42 via a serial bus 41, and the dispatch FIFO(s) 42 transmit the bit-maps to the target adapter board 14. Positioned between the dispatch FIFO 42 and fiber optic encoders 44 is the real-time image registration device 46 as provided by the present invention. Preferably the registration device 46 is an application specific integrated circuit (ASIC); however, it is within the scope of the invention that the registration device can be constructed with other non-intelligent hardware devices such as standard TTL devices, CMOS devices; or can incorporated into single or multiple chip, nonintelligent implementations, such as programmable logic arrays (PALs), field programmable gate arrays (FPGAs), 7400 series logic, ASICs, or any hardware description language (HDL) based device. It is also within the scope of the invention that the registration circuitry may contain intelligent devices such as micro-processors or microcontrollers; however, due to reliability and speed concerns, use of such intelligent devices is not preferred.

The registration device 46 has access to CPU address and data busses 48, 50 of the GPU 37 located in the graphics processing section 36. As the operator indicates a need for image registration by activating the associated cursor keys 29 on the operator input panel 28, a Horizontal Holding Register 90 ("HHR", see FIG. 3) and a Vertical Holding Register 192 ("VHR", see FIG. 8), both of which are preferably located within the registration device 46, will be updated by the external GPU 37 via CPU address and data busses 48, 50. Therefore, the GPU 37 converts the operator's inputs (which may specify direction and distance of registration in angles and inches, for example) into the actual magnitude and directions of registration in pixel counts.

In the preferred embodiment, the 8-bit HHR specifies the horizontal registration or image side-to-side movement across the web. The contents of the HHR is a two'scomplement binary number which allows, as will be described below, horizontal registration in two opposite directions. The displacement range is from −128 bits through +127 bits. A value of zero corresponds to no registration, a positive value causes the image to move to the right on the printed page, while a negative value causes movement to the left. As will be described in detail below, a positive value corresponds to the number of zero-valued (NULL) bits or pixels that are inserted at the beginning of each scan-line before the real image data pixels, and to preserve the correct image width, the same number of real image data pixels must be clipped from the end of each scan-line by the same amount. Correspondingly, a negative value corresponds to the number of real image data bits or pixels that are skipped or clipped (not sent to the print engine) at the start of each scan-line. Again, to preserve the correct image width, the end of each scan-line gets padded by the same amount of NULL pixels.

Also in the preferred embodiment, the 13-bit VHR specifies the delay in scanline integers between the assertion of the Page Detect signal 62 received by the system and the start of printing of a new page by the print engine. The external Page Detect signal can be derived from a sensor monitoring the position of the paper and is transmitted to the registration device 46. The contents of the VHR provide the vertical registration range of 8192 scan-lines when referenced to this Page Detect signal.

From the dispatch FIFO 42, the registration device receives the end-of-page input ("EOP") 52, the FIFO-empty input ("F_EMPTY") 54 and the 16-bit blocks rasterized scan-line data from the 16-bit data line 56 ("FDATA"). The registration device 46 toggles the FIFO read output ("FIFORD") 58 when the registration device is ready to receive another 16-bit block (or data "word") of the rasterized bit-map image data from the dispatch FIFO 42. From the marking engine 12, the registration device 46 receives the scan clock input ("SCANCLK") 60 and the Page Detect input 62. The fiber optic encoder 44 receives the resulting 16-bit registered scan-line block on the QOUT bus 64 during the strobing of the "fiber optic send" output ("FBRSND") 66, encodes the registered scan-line block into a fiber optic serial data stream which is dispatched to the TAB board and, in turn, to the marking engine. It is to be understood that even though the terms "data block" or "block" used in the preferred embodiment refers to a 16-bit data word, the terms as utilized in the attached claims can correspond to any multi-bit contiguous group of pixels or bits, and preferably corresponds to a multi-bit contiguous group of pixels of M bits, where M equals $2_N$, and where N is an integer (i.e., M equals 8 bits, 16, bits, 32 bits, etc.).

Horizontal Registration Circuitry

Figure 3:
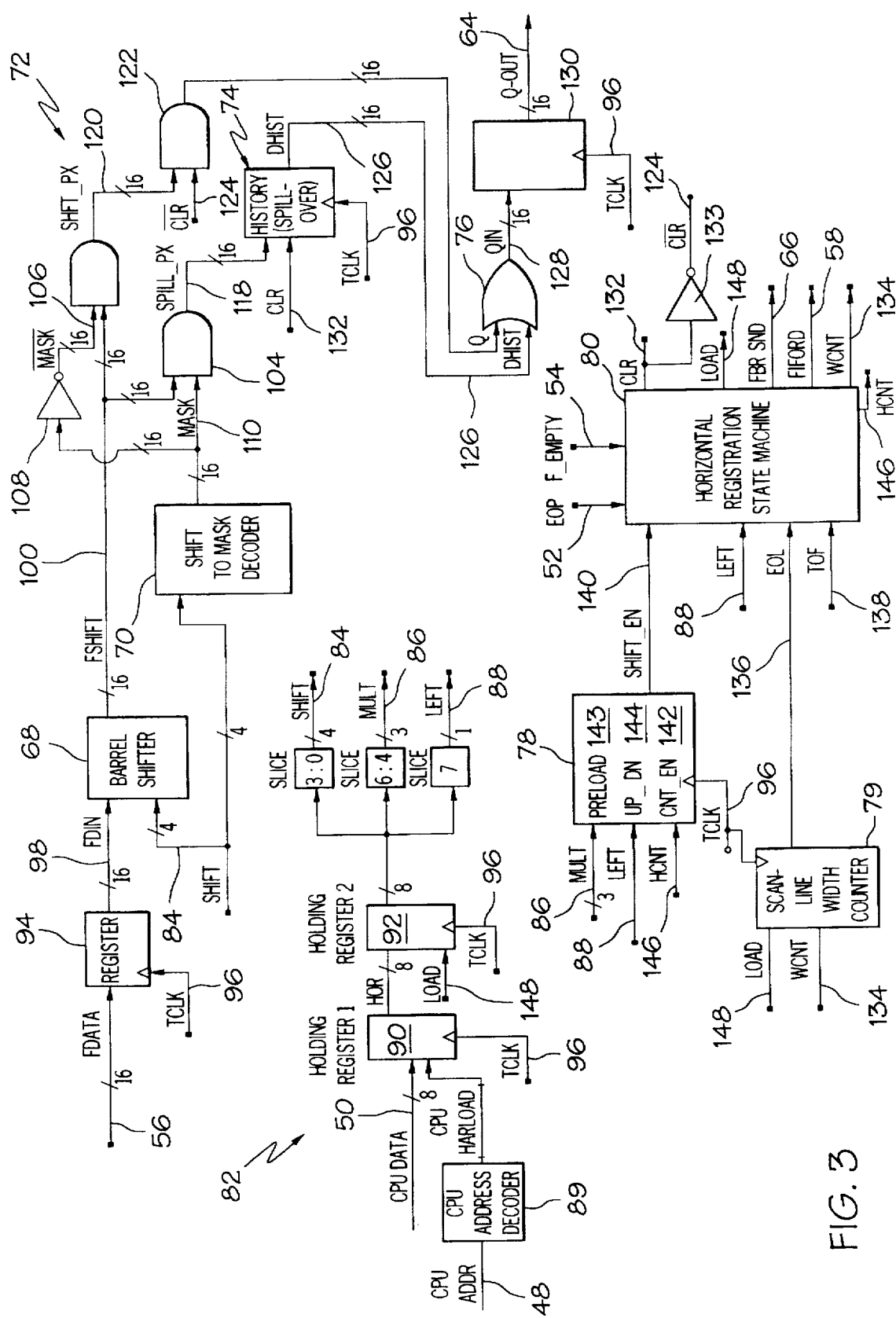
FIG. 3 is a schematic block diagram of horizontal registration circuitry of the present invention.

As shown in FIG. 3, the architecture or circuitry responsible for the horizontal registration of the image in the registration device 46 generally comprises a barrel shifter 68, a shift-to-mask decoder 70, image data isolation circuitry 72, a history (spill over) register 74, a logical OR device (adding device) 76, a word counter 78, a scanline width counter 79, and a horizontal registration state machine ("HRSM") 80. Also contained in the horizontal registration architecture of the registration device 46 is holding register circuitry 82.

The holding register circuitry 82 is responsible for double-buffering the contents of the HHR 90, referred to hereinafter as the "horizontal registration value 83," and for breaking up the horizontal registration value 83 into three separate bit-slices (see FIG. 4). In the preferred embodiment, the bit-slice comprising the four least significant bits of the horizontal registration value 83 is the SHIFT bit-slice 84. The SHIFT bit-slice 84 is N bits wide, where "N" depends upon the data width size "M" of the barrel shifter 68. Basically, the width of the SHIFT slice, N, equals $\log_2(M)$. Because, in the preferred embodiment, the barrel shifter has a data width capability of one word (16-bits), the SHIFT bit-slice is four bits wide (N=4) which allows the value of the SHIFT bit-slice to range from 0 to 15. Alternatively, if the barrel shifter had a data width capability of 32 bits, then the SHIFT size would accordingly need to be five bits wide (N =5), and so on.

The contiguous bits between the most significant bit of the horizontal registration value 83 and the SHIFT bit-slice comprise the MULT bit-slice 86. As will be described in detail below, the value of the MULT bit-slice 86 determines the number of pixel words to pad to or to clip from the beginning of the scan-line.

The most significant bit in the horizontal registration value 83 contains the LEFT bit-slice 88. This bit-slice determines the direction of the horizontal registration. In the preferred embodiment, if this bit is set, registration is to be to the left and, if the bit is reset, then the registration is to be to the right.

The holding register circuitry 82 also contains a CPU address decoder 89, the horizontal holding register 90 and a second horizontal holding register 92. Because the horizontal registration value 83 will need to be accessed twice for each scan-line (at the beginning of the scan-line to determine the number of pixels to pad or clip from the beginning of the scan-line, and at the end of the scan-line to determine the number of words to, in turn, clip or pad to the end of the scan-line), the horizontal registration value is buffered in two registers, the horizontal holding register 90 and the second holding register 92. This double buffering of the horizontal registration value 83 allows the GPU 37 to freely update the horizontal holding register 90 at any time during a scan-line interval. Preferably, the contents of the horizontal holding register 90 are transferred to the second holding register 92 at the start of every scan-line (upon activation of the LOAD signal 148), thus preserving the same registration value during the beginning and end of each scan-line. Alternatively, the contents of the second horizontal holding register 92 could be loaded only at the start of every page to preserve the same registration value for the entire page.

The 16-bit block (word) of scan-line data sent from the dispatch FIFO 42 over the FDATA line 56 is initially latched into a data register 94. Upon the next cycle of the system clock 96, this present image data block ("FDIN") 98 is fed through the barrel shifter 68. The barrel shifter 68 will barrel shift to the right FDIN block n bits, where n equals the value of the SHIFT bit-slice 84, the SHIFT bit-slice being an input into the barrel shifter. Therefore, the 16-bit output block from the barrel shifter ("FSHFT") 100 is the FDIN block barrel shifted n bits to the right. The FSHFT block 100 is sent as an input to both ANDing device 102 and to ANDing device 104 of the image data isolation circuitry 72.

The ANDing devices 102, 104 are respectively used for isolating the set of spillover pixels and the set of shifted pixels from the FSHFT block (the spill-over pixels are the pixels barrel-shifted from the LSB to the MSB during the barrel-shift operation, and the shifted pixels are the remaining pixels which were merely shifted to the right). The shifted pixels are isolated from the FSHFT block 100 by ANDing the FSHFT block 100 with the mask block ("MASK") 110 generated by the shift-to-mask decoder 70; and the spill-over pixels are isolated by ANDing the FSHFT data 100 with the complemented mask block ("MASK") 106 (which is the mask block 110 generated by the shift-to-mask decoder 70 and complemented by the NOT device 108).

Figure 5:
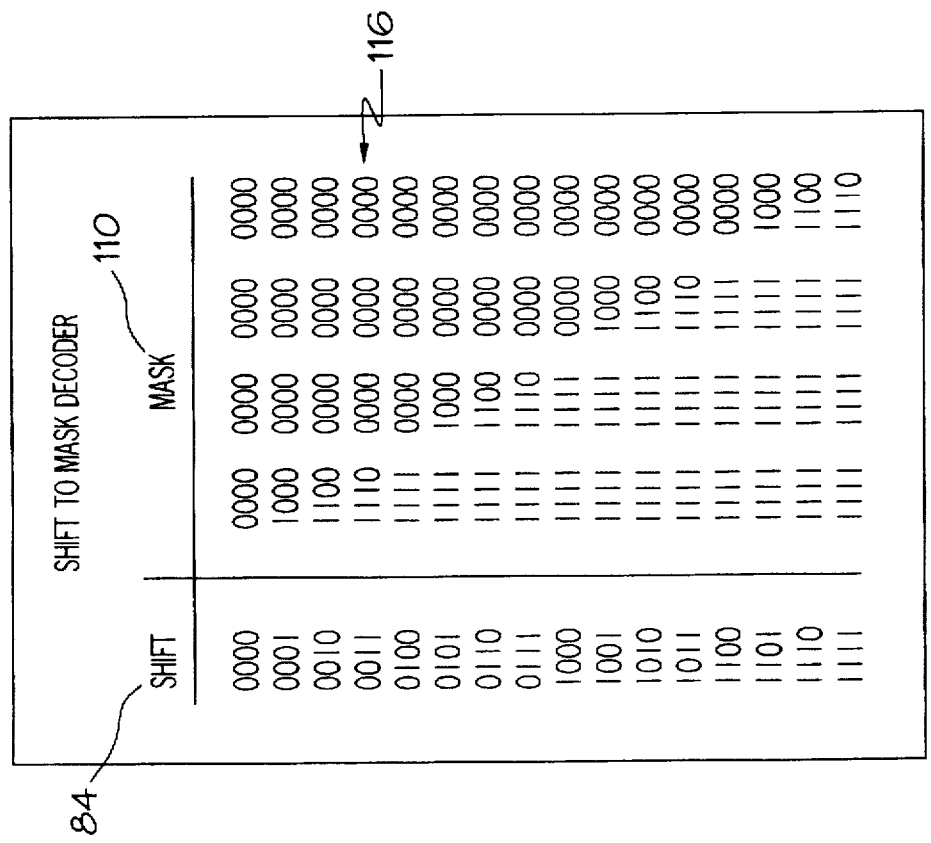
FIG. 5 is a shift-to-mask decoder table.
Figure 4:
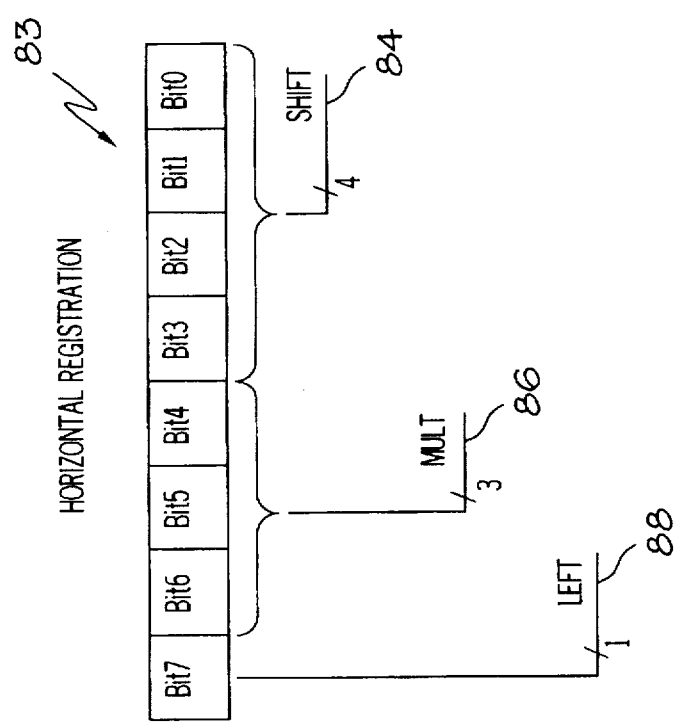
FIG. 4 is a diagram of the horizontal registration value byte fields.

As shown in FIGS. 3, 4 and 5, the shift-to-mask decoder 70 receives the four bit SHIFT bit-slice 84 and generates the MASK block 110 according to the value of the SHIFT bit-slice 84. Referring to FIG. 5, the value of the SHIFT bit-slice 84 indicates the number of consecutive bits from the MSB of the MASK block 110 to set; the remaining bits in the MASK block being reset. For example, if the value of the SHIFT bit-slice is 0, none of the bits in the MASK block will be set; if the value of the SHIFT bit-slice is 3, the 3 most significant bits of the MASK block will be set; and if the value of the SHIFT bit-slice is 15, the 15 most significant bits in the MASK block will be set.

Referring back to FIG. 3, the spill-over pixels are isolated by ANDing the FSHFT block 100 with the MASK block 110 to produce an isolated spill-over block ("SPILL_$_{PX}$") 118, and the shifted pixels are isolated by ANDing the FSHFT block 100 with the complemented $\overline{\text{MASK}}$ block 106 to produce an isolated shifted block ("SHFT_PX") 120. For example, referring to FIGS. 3 and 6, if the SHIFT bit-slice 84 has a value of 3, the barrel shifter 68 will barrel shift the FDIN block 98 (shown in FIG. 6A) to the right three pixels such that the FSHFT block 100 output from the barrel shifter (shown in FIG. 6B) will have the three least significant bits of the original data block, pixels 14, 15 and 16, in the three most significant bit locations (the spill-over pixels 112); and the FSHFT data 100 will correspondingly have the rest of the pixels of the original data block, pixels 1–13, shifted to the right three bits (the shifted pixels 114).

Referring now to FIGS. 3, 5 and 6, because the value of the SHIFT bit-slice is three, the MASK block 110 will have its three most significant bits set as shown at 116 (FIG. 5). Accordingly, the SPILL_PX block 118 (shown in FIG. 6C) generated by the ANDing device 104 will contain only the spill-over pixels 112; and the SHFT_PX block 120 (shown in FIG. 6D) generated by the ANDing device 102 will comprise only the shifted pixels 114.

As shown in FIG. 3 the SPILL_PX block 118 is latched in the history register 74, and the SHFT_PX block 120 is sent to an addend input of ANDing device 122. The other addend input of the ANDing device 122 is a complemented 16-bit clear input ("$\overline{\text{CLR}}$") 124, which is a "clear output" signal ("CLR") 132 generated by the HRSM 80 and complemented by a NOT device 133. Assuming that the CLR signal 132 is reset (meaning that the complemented $\overline{\text{CLR}}$ signal 124 is set), the output ("Q") 125 of the ANDing device 122 will be equal to the SHFT_PX block 120 (i.e., the output of the ANDing device 122 will not be "cleared"), which is sent to an input of the logical ORing (adding) device 76. The other input into the logical ORing device 76 is the output of the history register ("DHIST") 126. Because the SPILL_PX block 118 input into the history register 74 is latched on the clock cycle, DHIST 126, the output of the history register 74 is the isolated spill-over block latched on the previous clock cycle. For example, as shown in FIG. 6E, the DHIST block 126 will contain old pixels 14', 15' and 16'(old spill-over pixels 112'). Therefore the output of the ORing device 76 will be the registered data block ("QIN") 128 which is the sum of the DHIST block 126 and SHFT_PX block 120 (see FIG. 6F). QIN 128 is buffered in register 130, and available to the fiber optic encoder 44 over the QOUT bus 64.

If the CLR signal 132 had been set by the HRSM 80, then the output 125 of the ANDing device 122 would have been NULL pixels. Furthermore, because the CLR signal 132 is input to a "reset" line of the history register 74, if the CLR signal 132 had been set, then the contents of the history register would have been cleared and the output of the history register would have likewise been NULL pixels. The process for generating the CLR signal 132 is described below.

Although a barrel shifter 68 is utilized in the preferred embodiment, it should be apparent to one of ordinary skill in the art, at this point, that any type of data shifting and isolating devices which can shift the bit-map data and isolate the shifted data from the spill-over (or "overflow") data, in a similar fashion as described above, will fall within the scope of the present invention. Furthermore, because a two's-complement binary value is utilized in the preferred embodiment for the horizontal registration value 83, only one direction of shift (shift right) is necessary; and hence, in the preferred embodiment, the same shifter can be used for horizontal registration in both directions. Nevertheless, it is within the scope of the invention to provide a data shifter (or shifters) which can shift in opposite directions depending upon the direction of registration required.

The word counter 78, shown in FIG. 3, is used to count the number of pixel blocks to be padded to the beginning of the scan-line or the number of pixel blocks to be clipped from the beginning of the scan-line. Blocks will be padded to or clipped from the beginning of the scan-line if the magnitude of the horizontal registration value 83 is greater than or equal to the data size of the barrel shift register 68 (meaning that the MULT bit-slice 86 is greater than 0 for positive horizontal registration values and that the MULT bit-slice is less than 7 for negative horizontal registration values). The word counter sets the SHIFT_EN output 140 when finished counting words. As will be described below, the SHIFT_EN signal indicates to the HRSM 80 to allow the barrel shifting, isolating and adding operations to be performed on the scan-line blocks as described above. The MULT bit-slice 86 is sent to the pre-load input 143 of the word counter 78, the LEFT bit-slice is sent to the count-up/down designator input 144 of the word counter 78, and a horizontal count-enable output ("HCNT") 146 is sent from the HRSM 80. Also sent to the word counter 78 is the system clock TCLK 96. The word counter 78 has a count-up or count-down capability which depends upon the value of the count-up/down input 144. The LEFT bit-slice 88 is fed into this input 144 such that if the LEFT bit-slice bit is set then the word counter 78 will count up from the preload input 143, and if the LEFT bit-slice bit is reset then the word counter 78 will count down from the preload input 143. When the word counter 78 counts down to zero or counts up to seven (111b), the word counter 78 has completed its count and thus activates the SHIFT_EN output 140. Note that if the size of the MULT bit-slice 86 were 4 bits, the word counter 78 (if counting up) would count up to fifteen (1111b) and if the size of the MULT bit-slice 86 were 2 bits, the word counter 78 (if counting up) would count up to three (11 b). When counting down, the word counter 78 always counts down to zero.

The Horizontal Registration State Machine ("HRSM") 80 is responsible for coordinating the registration of the scan-line between the dispatch FIFO 42 and the fiber-optic encoders 44. Accordingly, outputs from the HRSM 80 include the "FIFOread" signal FIFORD 58 and the "fiber-optic send" signal FBRSND 66. Activation of the FIFORD output 58 instructs the dispatch FIFO 42 to transmit a word of scan-line data over the FDATA line 56 to the data register 94, and activation of the FBRSND output 66 clocks data to the fiber optic encoder 44 from the QOUT bus 64. The fiber optic encoder 44 in turn encodes the registered scan-line block into a fiber optic serial data stream which is dispatched to the TAB (which, in turn, dispatches the data to the marking engine). Other outputs from the HRSM 80 include the CLR 132 signal as discussed above, the HCNT output 146 as discussed above, a LOAD output 148, and a "scan-line width counter enable" ("WCNT") output 134. Inputs into the HRSM 80 include the EOP signal 52, the FIFO-empty signal ("F_EMPTY") 54 from the dispatch FIFO 42, the LEFT bit-slice 88, the end-of-line signal ("EOL") 136, the top-of-form signal ("TOF") 138 sent by the vertical registration architecture (as will be described below), and the SHIFT_EN signal 140 sent by the word counter 78.

Figure 7:
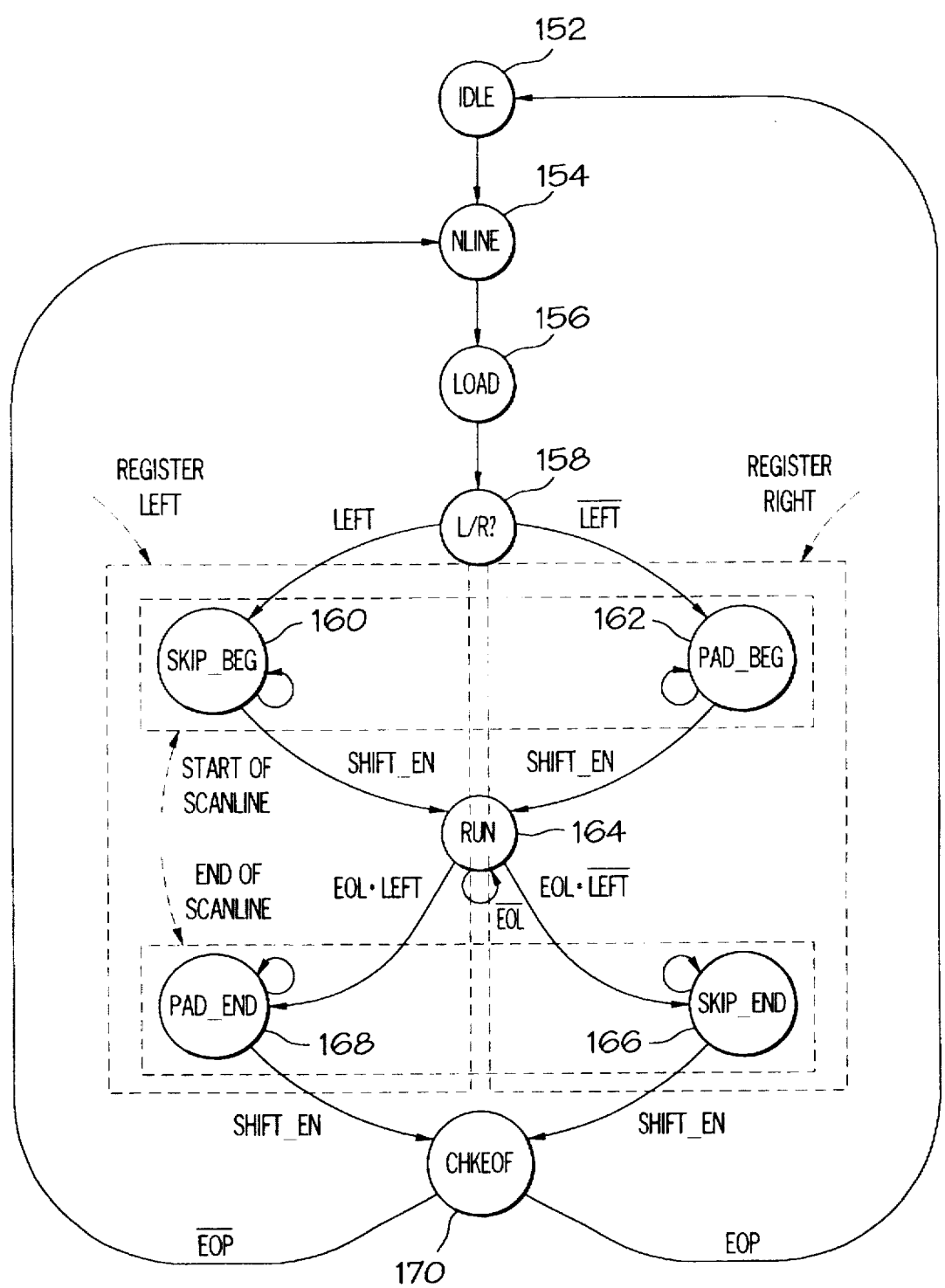
FIG. 7 is a state diagram of the horizontal registration state machine of FIG. 3.

As shown in FIG. 7 the horizontal registration state machine 80 has several operative states, and the outputs of the HRSM 80 will depend upon the particular operative state that the HRSM 80 is in.

The HRSM 80 begins in an IDLE state 152, in which HRSM 80 continuously waits for the GPU 37 to activate bit-map dispatching to the printer. Once the bit-map dispatching is initiated, the HRSM 80 advances to the "new line" NLINE state 154. In the NLINE state both the FBRSND 66 and FIFORD 58 outputs remain reset, indicating that no scan-line words are being taken from the dispatch FIFOs 42; sent through the barrel-shifter 68, the isolation circuitry 72, and the adding device 76; and transmitted to the fiber optic encoders 44. Also, in the NLINE state 154, the HRSM 80 will activate the CLR output 132 to reset the contents of the history register 74.

The HRSM 80 advances next to the LOAD state 156 in which it toggles the LOAD output 148 and toggles the FIFORD output 58 without toggling the FBRSND output 66. Thus, in this state, the first block of scan-line data, taken from the FDATA line 56, is sent through the barrel-shifter 68, the isolation circuitry 72, and the adding device 76 without being transmitted to the fiber optic encoders 44. Because the history register 74 was cleared in the NLINE state above, the DHIST data 126 will be NULL and thus QIN 128 will contain only the SHFT_PX block 120 (the isolated shifted pixels). Toggling the LOAD output 148 transfers the horizontal registration value 83 from the first horizontal holding register 90 to the second horizontal holding register 92.

Next, the HRSM 80 advances to the UR state 158 to determine the direction of registration from the LEFT bit-slice 88. If the LEFT bit-slice 88 is set (indicating registration to the left), then the HRSM 80 advances to the SKIP_BEG state 160 in order to begin clipping pixels from the beginning of the scan-line. However, if the LEFT bit-slice 88 is reset (indicating registration to the right) the HRSM 80 advances to the PAD_BEG state 162 to begin padding NULL pixels to the beginning of the scanline. Upon entering either the SKIP_BEG state 160 or the PAD_BEG state 162, the HRSM 80 activates the WCNT output 134 such that the scan-line width counter begins counting down from a value equal to the width of the scan-line.

While in the SKIP_BEG state 160, the HRSM 80 will activate HCNT signal 146, and will wait for the SHIFT_EN signal 140 to be activated by the word counter 78 (upon the word counter counting up from the MULT bit-slice 86 value to seven). Once the SHIFT_EN signal 140 is set, the HRSM 80 will advance to the RUN state 164. The FIFORD signal 58 is toggled for each count of the system clock TCLK 96 while waiting for the word counter to time out in the SKIP_BEG state 160. Furthermore, the FIFORD signal 58 is always toggled one additional time before advancing to the RUN state 164. Thus, if the MULT bit-slice 86 value equals seven upon entering this state (indicating that the amount of registration left is less than one word) the FIFORD signal 58 is toggled once. This toggling of the FIFORD signal 58 causes the next scan-line block to be taken from the FDATA line 56 and sent through the barrel-shift register 68, the isolation circuitry 72, and the adding device 76. Because the FBRSND signal 66 is never toggled in this state, the first contents of the QIN block 128 are never sent to the fiber-optic encoders, and are thus overwritten by the next QIN block created above. Therefore, every time the FIFORD output 58 is toggled without simultaneously toggling the FBRSND output 66, the pixels present in the QIN block prior to the toggling of the FIFORD output are "clipped" from the scan-line.

If the HRSM 80 had advanced to the PAD_BEG state 162 from the UR state 158, the HRSM 80 will activate the CLR output 132 and the HCNT output 146, and will continue toggling the FBRSND output 66 (without toggling the FIFORD output 58) until the SHIFT_EN signal 140 is activated by the word counter 78 counting down from the MULT bit-slice 86 value to zero. If the MULT bit-slice 86 value is zero upon entering this state, the HRSM 80 advances immediately to the RUN state 164 without toggling the FBRSND output 66. By having the CLR output 132 set while toggling the FBRSND output 66, NULL pixel words are being transmitted to the fiber optic encoder 44 from the QOUT bus 64 (NULL pixel words are being padded to the beginning of the scanline). Once the SHIFT_EN input 140 is activated in this state, the HRSM 80 advances to the RUN state 164.

When the HRSM 80 has advanced to the RUN state 164 the HRSM 80 begins toggling the FBRSND output 66 and the FIFORD output 58 simultaneously until the EOL signal 136 is activated by a scan-line width counter (not shown). The CLR signal 132 and the HCNT signal 146 are reset in this state. The continuous toggling of the FBRSND output 66 and the FIFORD output 58 causes scan-line words to be continuously taken from the dispatch FIFOs 42; sent through the barrel-shifter 68, the isolation circuitry 72, and the adding device 76; and continuously transmitted to the fiber optic encoders 44.

When the EOL output 136 is activated by the scan-line width counter 79, meaning that either an entire scan-line has been taken from the dispatch FIFO 42 or an entire scan-line's worth of data has been transmitted to the marking engine, the HRSM 80 will need to pad or clip pixels to or from the end of the scan-line depending upon whether the HRSM 80 had padded or clipped pixels to or from the beginning of the scan-line. If the HRSM 80 padded NULL pixels to the beginning of the scan-line in the PAD_BEG state 162, then the HRSM 80 must now clip pixels to the beginning of the scan-line; and conversely, if the HRSM 80 had clipped pixels from the beginning of the scan-line in the SKIP_BEG state 160, the HRSM 80 must now pad null pixels to the end of the scan-line. Therefore, in the RUN state 164, upon the activation of the EOL input signal 136, if the LEFT signal 88 is reset (indicating to the need to now clip pixels from the end of the scan-line) then the HRSM 80 advances to SKIP_END state 166. Conversely, while in the RUN state 164, upon the activation of the EOL input signal 136, if the LEFT signal is set (indicating to the need to pad pixels to the end of the scan-line) then the HRSM 80 advances to the PAD_END state 168.

In the PAD_END state 168, the HRSM 80 will pad the same number of NULL pixel blocks to the end of the scan-line as were clipped from the beginning of the scanline in the SKIP_BEG state 160 described above. The PAD_END state 168 operates substantially the same as the PAD_BEG state 162 described above, except that the number of times to toggle the FIFORD signal 58 will equal the number of counts to count up from the value of the MULT bit-slice 86 to seven, plus one additional count. In the SKIP_END state 166, the HRSM 80 will clip the same number of pixel blocks from the end of the scan-line as were padded to the beginning of the scan-line in the PAD_BEG state 162 described above. The SKIP_END state 166 operates substantially the same as the SKIP_BEG state 160 except that the FBRSND signal 66 will be toggled only a number of times equal to the MULT bit-slice 86 value. From the SKIP_END and PAD_END states 166,168, the HRSM 80 advances next to the CHKEOF state 170.

In the CHKEOF state 170 the HRSM 80 checks to see if the EOP input 52 is set. If the EOP input 52 is set, indicating that an entire form has been sent to the print engine, the HRSM 80 advances to the IDLE state 152 to wait for a GPU command to dispatch another page. Otherwise, if the EOP input 52 is not set the HRSM 80 advances to the NLINE state 154 to begin registering the next scan-line of bit-map data.

Operation of the horizontal registration circuitry for the present invention can be described in the following four examples. In all four examples, it is assumed that only one scan-line is to be horizontally registered, and it is also assumed that this scan-line has only forty-eight pixels which are labeled P1, P2, P3 ... P48.

Example I

In this example, the horizontal registration value 83 is read from the HHR 90 as:

0000 0011 b

Therefore, in this example, the horizontal registration is to be a three pixel move to the right because the value of the horizontal registration value equals positive three. Referring to FIG. 4 it can be seen that the LEFT, MULT, and SHIFT bit-slices 88, 86, 84, will be broken out from the horizontal registration value as:

LEFT = 0
MULT = 000b = 0
SHIFT = 0011b = 3

Referring now to FIGS. 3, 7A and 7B, when the HRSM 80 advances to the LOAD state 156, activating the FIFORD output 58, the first scan-line word is read from the dispatch FIFO 42 over the FDATA line 56 as:

MSB                                                      LSB
P1 P2 P3 P4 P5 P6 P7 P8 P9 P10 P11 P12 P13 P14 P15 P16

Thus, the first FSHFT block 100, output from the barrel shifter 68 (barrel shifted to the right three pixels because the SHIFT bit-slice 84 is three) will be:

MSB                                                      LSB
P14 P15 P16 P1 P2 P3 P4 P5 P6 P7 P8 P9 P10 P11 P12 P13 and, referring to FIG. 5, because the SHIFT bit-slice 84 is three, the output MASK 110 of the shift to mask decoder 70 will be:

1110 0000 0000 0000 b

Accordingly, the first SHFT_PX block 120, output from the ANDing device 102, will be:

MSB                                                      LSB
0  0  0  P1 P2 P3 P4 P5 P6 P7 P8 P9 P10 P11 P12 P13 and the first SPILL_PX block 118, output from the ANDing device 104 will be:

MSB                                                      LSB
P14 P15 P16 0  0  0  0  0  0  0  0  0  0  0  0  0

The first DHIST block 126, output from the history register 74 on this clock cycle, will be zero because in the NLINE state 154, prior to advancing to the present LOAD state 156, the CLR output 132 was activated, and thus the history register 74 was reset. Therefore, the first QIN block 128 output from the ORing device 76 will be (DHIST +SHFT_PX):

MSB                                                      LSB
0  0  0  P1 P2 P3 P4 P5 P6 P7 P8 P9 P10 P11 P12 P13

Because both the LEFT bit-slice 88 and the MULT bit-slice 86 are zero, the HRSM 80 next advances from the LOAD state 156, through the PAD_BEG state 162, to the RUN state 164 without activating the word counter 78. In the RUN state 164, upon the first toggling of the FBRSND output 66, the first QIN block 128 is transmitted from the QOUT bus 64 to the fiber optic encoders 44. Also, upon the first toggling of the FIFORD output 58 in this state, the second scan-line word will be read from the dispatch FIFO 42 as:

MSB                                                      LSB
P17 P18 P19 P20 P21 P22 P23 P24 P25 P26 P27 P28 P29 P30 P31 P32

This second scan-line word will be sent through the registration circuitry as above. Therefore, the second FSHFT block 100, output from the barrel shifter 68 will be:

MSB                                                      LSB
P30 P31 P32 P17 P18 P19 P20 P21 P22 P23 P24 P25 P26 P27 P28 P29 the second SHFT_PX block 120, output from the ANDing device 102, will be:

MSB                                                      LSB
0  0  0  P17 P18 P19 P20 P21 P22 P23 P24 P25 P26 P27 P28 P29 the second SPILL_PX block 118, output from the ANDing device 104 will be:

MSB                                                      LSB
P30 P31 P32 0  0  0  0  0  0  0  0  0  0  0  0  0 and the second DHIST block 126, output from the history register 74 will be:

MSB                                                      LSB
P14 P15 P16 0  0  0  0  0  0  0  0  0  0  0  0  0

Notice that this block contains the spill-over pixels from the barrel-shift operation performed on the first block of scan-line data. Therefore, the second QIN block 128, output from the ORing device 76 and subsequently transmitted to the fiber optic encoders 44 will be (DHIST 126+SHFT_PX 120):

MSB                                                      LSB
P14 P15 P16 P17 P18 P19 P20 P21 P22 P23 P24 P25 P26 P27 P28 P29

Based upon the above description, it can be seen that the above shifting, isolating and history adding operations performed on the third scan-line word taken from the dispatch FIFO 42 will result in the following third QIN block 128 (which will be transmitted to the fiber optic encoders):

MSB                                                                 LSB
P30 P31 P32 P33 P34 P35 P36 P37 P38 P39 P40 P41 P42 P43 P44 P45

And upon this third registered scan-line block being transmitted to the fiber optic encoders, the EOL input will be activated, prompting the HRSM 80 to advance to the SKIP_END state 166, and subsequently to the CHKEOF state 170. Thus, in this example, pixels P46, P47 and P48 are not transmitted to the fiber optic encoders 44 but are "clipped" from the end of the scan-line.

Example II

In this example, the horizontal registration value 83 is read from the HHR 90 as:

0001 0011 b

Therefore, in this example, the horizontal registration is to be a nineteen pixel move to the right because the value of the horizontal registration value 83 equals positive nineteen. Referring to FIG. 4 it can be seen that the LEFT, MULT, and SHIFT bit-slices 88, 86, 84, will be broken out from the horizontal registration value as:

LEFT = 0
MULT = 001b = 0
SHIFT = 0011b = 3

Referring now to FIGS. 3 and 7, when the HRSM 80 advances to the LOAD state 156, activating the FIFORD output 58, the first scan-line word is read from the dispatch FIFO 42 over the FDATA line 56, sent through the barrel-shifter 68, the isolation circuitry 72, and the adding device 76 as in Example I above, and the first QIN block 128 output from the ORing device 76 will be (DHIST 126+SHFT_PX 120):

MSB                                                         LSB
0  0  0  P1 P2 P3 P4 P5 P6 P7 P8 P9 P10 P11 P12 P13

However, because the MULT bit-slice 86 in this example equals one and because the LEFT bit-slice 88 is zero, the HRSM 80 next advances to the PAD_BEG state 162 to pad one NULL word to the beginning of the scan-line. Therefore, the first block sent to the fiber optic encoders 44 will be a NULL pixel block, and the contents of the QIN block 128 will remain unchanged. From the PAD_BEG 162 state, the HRSM 80 next advances to the RUN state 164.

In the RUN state 164, upon the first toggling of the FBRSND output 66, the first QIN block 128 is taken by the fiber optic encoders 44 and dispatched to the marking engines via the TAB. Thus the second word transmitted to the fiber optic encoders 44 will be the first QIN block 128 created above. Also, upon the first toggling of the FIFORD signal 58 in this state, the second data word will be read from the dispatch FIFO 42, sent through the barrel-shifter 68, the isolation circuitry 72, and the adding device 76 as in Example I above, and the second QIN block 128 output from the ORing device 76 will be (DHIST+SHFT_PX):

MSB                                                             LSB
P14 P15 P16 P17 P18 P19 P20 P21 P22 P23 P24 P25 P26 P27 P28 P29

Because this is the third block transmitted to the fiber-optic encoders 44, the EOL signal 136 will be activated, informing the HRSM 80 to advance to the SKIP_END state 166. In the SKIP_END state 166, the HRSM 80 toggles the FIFORD output 58 a sufficient number of times to clip remaining pixels from the end of the scan-line. Thus, since nineteen NULL pixels (one pixel word plus three pixels) were padded to the beginning of the scan-line, nineteen pixels will be subsequently clipped from the end of the scan-line in this state.

Example III

In this example, the horizontal registration value 83 is read from the HHR 90 as:

1111 1101 b

Therefore, in this example, the horizontal registration is to be a three pixel move to the left because the (two's complement) value of the horizontal registration value 83 equals negative three. Referring to FIG. 4 it can be seen that the LEFT, MULT, and SHIFT bit-slices 88, 86, 84, will be broken out from the horizontal registration value as:

LEFT = 1
MULT = 111b = 7
SHIFT = 1101b = 13

Referring now to FIGS. 3 and 7, when the HRSM 80 advances to the LOAD state 156, activating the FIFORD output 58, the first scan-line word is read from the dispatch FIFO 42 over the FDATA line 56 as:

MSB                                                     LSB
P1 P2 P3 P4 P5 P6 P7 P8 P9 P10 P11 P12 P13 P14 P15 P16

Thus, the first FSHFT block 100, output from the barrel shifter 68 (barrel shifted to the right thirteen pixels because the SHIFT bit-slice is thirteen) will be:

MSB                                                     LSB
P4 P5 P6 P7 P8 P9 P10 P11 P12 P13 P14 P15 P16 P1 P2 P3 and, referring to FIG. 5, because the SHIFT bit-slice 84 is thirteen, the output MASK 110 generated by the shift-to-mask decoder 70 will be:

1111 1111 1111 1000 b

Accordingly, the first SHFT_PX block 120, output from the ANDing device 102, will be:

MSB                                                 LSB
0  0  0  0  0  0  0  0  0  0  0  0  0  P1 P2 P3 and the first SPILL_PX block 118, output from the ANDing device 104 will be:

MSB                                                         LSB
P4 P5 P6 P7 P8 P9 P10 P11 P12 P13 P14 P15 P16 0  0  0

The first DHIST block 126, output from the history register 74 on this clock cycle, will be zero because in the NLINE state 154, prior to advancing to the present LOAD state 156, the CLR 132 output was activated, and thus the history register 74 was reset. Therefore, the first QIN block 128 output from the ORing device 76 will be (DHIST 126+SHFT_PX 120):

```
         MSB                              LSB
         0 0 0 0 0 0 0 0 0 0 0 0 0 P1 P2 P3
```

Because the LEFT bit-slice 88 is set, the HRSM 80 next advances to the SKIP_BEG state 160. In the SKIP_BEG state 160, the HRSM 80 only toggles the FIFORD 58 signal once because the MULT bit-slice 86 already equals seven. Therefore, the second data word is taken from the dispatch FIFO 42 as:

```
MSB                                                    LSB
P17 P18 P19 P20 P21 P22 P23 P24 P25 P26 P27 P28 P29 P30 P31 P32
``` and is sent through the barrel-shifter 68, the isolation circuitry 72, and the adding device 76 as follows, such that the second QIN block (overwriting the first QIN block), output from the ORing device 76 will be:

```
MSB                                                 LSB
P4 P5 P6 P7 P8 P9 P10 P11 P12 P13 P14 P15 P16 P17 P18 P19
```

Because the first QIN block was overwritten by the second QIN block above, pixels P1 P3 have been clipped from the beginning of the scan-line.

In the RUN state 164, upon the first toggling of the FBRSND output 66, the second QIN block 128 is transferred to the fiber optic encoders 44. Also, upon the first toggling of the FIFORD output 58 in this state, the third data word is taken from the dispatch FIFOs 42 and sent through the barrel-shift register 68, the isolation circuitry 72, and the adding device 76 as above such that the third QIN block 128 (which is the second block to be transmitted to the fiber optic encoders 44) is:

```
MSB                                                     LSB
P20 P21 P22 P23 P24 P25 P26 P27 P28 P29 P30 P31 P32 P33 P34 P35
```

Furthermore, at this point the SPILL_PX block 118 presently stored in the history register is:

```
MSB                                                     LSB
P36 P37 P38 P39 P40 P41 P42 P43 P44 P45 P46 P47 P48 0 0 0
```

Upon reading the third data word from the dispatch FIFO 42, the EOL input 136 is activated. Therefore, because the LEFT bit-slice 88 is set, the HRSM 80 advances from the RUN state to the PAD_END state 168. In the PAD_END state 168 the HRSM 80 toggles the FBRSND output 66 once (due to the MULT bit-slice equalling seven), such that the block stored in the history register 74 is the third and final registered scan-line block to be transferred to the fiber optic encoders for this scan-line.

Example IV

In this example, the horizontal registration value 83 is read from the HHR 90 as:

```
1110 1101 b
```

Therefore, in this example, the horizontal registration is to be a nineteen pixel move to the left because the value of the (two's complement) registration value equals negative nineteen. Referring to FIG. 4 it can be seen that the LEFT, MULT, and SHIFT bit-slices 88, 86, 84, will be broken out from the horizontal registration value 83 as:

```
LEFT = 1
MULT = 110b = 6
SHIFT = 1101b = 13
```

Referring now to FIGS. 3 and 7, when the HRSM 80 advances to the LOAD state 156, activating the FIFORD output 58, the first scan-line word read from the dispatch FIFO 42 over the FDATA line 56 as:

```
MSB                                            LSB
P1 P2 P3 P4 P5 P6 P7 P8 P9 P10 P11 P12 P13 P14 P15 P16
```

And referring to Example II above, because the SHIFT bit-slice 84 is thirteen, the first QIN block 128 output from the ORing device 76 will be (DHIST 126+SHFT_PX 120):

```
MSB                              LSB
0 0 0 0 0 0 0 0 0 0 0 0 0 P1 P2 P3
```

Because the LEFT bit-slice 88 is set, the HRSM 80 next advances to the SKIP_BEG state 160. In the SKIP_BEG state 160, the HRSM 80 toggles the FIFORD 58 output twice because the word counter must count up from six to seven. These two FIFORD 58 output toggles cause the second and third data words to be taken from the dispatch FIFO and sent through the barrel-shift register 68, the isolation circuitry 72, and the adding device 76, overwriting previous QIN blocks, such that the third QIN block, output from the ORing device 76 will be:

```
MSB                                                              LSB
P20 P21 P22 P23 P24 P25 P26 P27 P28 P29 P30 P31 P32 P33 P34 P35
``` and such that the SPILL_PX block 118 stored in the history register 74 will be:

```
MSB                                                    LSB
P36 P37 P38 P39 P40 P41 P42 P43 P44 P45 P46 P47 P48 0 0 0
```

Therefore, at this point Pixels P1–P19 have been clipped from the beginning of the scan-line. Upon reading the third scan-line word from the dispatch FIFO 42, the EOL signal 136 is activated. Therefore, the HRSM 80 advances to the RUN state 164 and remains in the RUN state for only one clock cycle such that the third QIN block 128 is sent to the fiber optic encoders 44. Next, in the PAD_END state 168, the HRSM 80 activates the CLR output 132, and toggles the FBRSND output 66 twice due to the word counter counting up from six to seven; thus transmitting to the end of the scanDocket line the block stored in the history register 78 as the second word transmitted to the fiber optic encoders 44 and a NULL pixel word as the third word transmitted to the fiber optic encoders 44.

VERTICAL REGISTRATION CIRCUITRY

Figure 8:
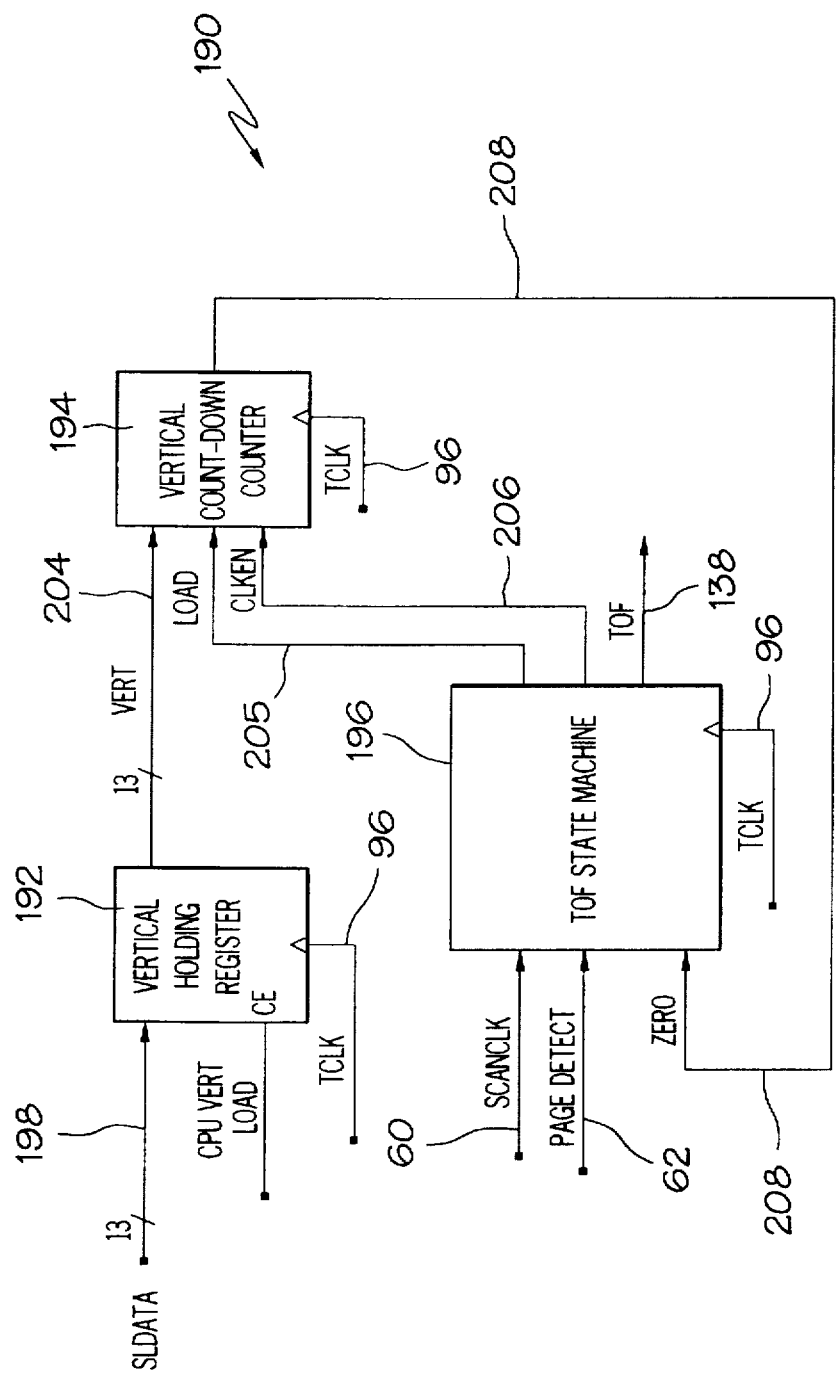
FIG. 8 is a schematic block diagram of the vertical registration circuitry of the present invention.

As shown in FIG. 8, the vertical image registration circuitry or architecture 190 of the registration device 46 comprises a vertical holding register 192, a vertical countdown counter 194 and a "top of form" state machine 196 ("TOFSM"). In the preferred embodiment, the 13-bit vertical holding register 192 is loaded by the GPU 37. The value in the vertical holding register 192 ("SLDATA" 198) indicates the magnitude of the vertical registration in scan clock units, which in turn indicates the length of delay before the TOFSM 196 will activate the TOF signal 138 after receiving the Page Detect signal 62 from the marking engine. As discussed above, the 13-bit vertical registration value 198 provides a vertical registration range of 8,192 scan-lines when referenced to the SCANCLK signal 60. For a 400 DPI system, a typical page map will consist of 4400 scan-lines (400 DPI×11 inches). The vertical registration range will consist of a value between 0 and 4399. Therefore, the printed area can start on any real scan-line of the page.

The vertical countdown counter 194 has a preload input ("VERT") 204, a LOAD input 205, and a "clock enable" (CLKEN) input 206. The LOAD input 205 and CLKEN inputs 206 are generated by the TOFSM 196. Upon the vertical countdown counter 194 decrementing from the preload value of VERT 204 to 0, the vertical countdown counter 194 will activate the ZERO output 208 which instructs the TOFSM 196 to, in turn, activate the TOF output 138, which in turn instructs the HRSM 80 to begin transmitting registered scan-line blocks to the marking engine.

In conclusion, having described the invention in detail and by reference to the drawings, it will be apparent that modifications and variations are possible without departing from the scope of the invention as defined in the following claims.

What is claimed is:

1. A method for registering an image, the image defined by a continuous stream of rasterized bit-map data, the method comprising the steps of:

detecting a misalignment of the image with respect to a form, and producing a registration value in response to a detection of misalignment;

acquiring a present block of the bit-map data from said stream;

shifting said present block a number of bits according to a shift count generated from said registration value to create a present contiguous set of shifted bit-map data bits and a present contiguous set of spill-over bit-map data bits;

storing said present set of spill-over bits;

combining said present set of shifted bits with a previous contiguous set of spillover bit-map data bits to create a present registered block of bit-map data; and dispatching said present registered block to a print engine.

2. The method of claim 1, wherein said steps of acquiring, shifting, storing, combining, and dispatching are repeated for an entire scan-line of the bit-map data.

3. The method of claim 1, wherein:

said shifting step includes a step of barrel-shifting said present block a number of bits according to said shift count;

said barrel-shifting step creates a present barrel-shifted block of bit-map data;

said barrel-shifted block including said present set of shifted bits and said present spill-over bits, and the method further comprises a first mask block generating step of generating a first mask block from said shift count, said first mask block being adapted to isolate said present set of shifted bits from said present barrel-shifted block.

4. The method of claim 3, further comprising a first isolating step of logically applying said first mask block to said present barrel-shifted block to create a present isolated shifted bits block.

5. The method of claim 4, further comprising the step of generating a second mask block, said second mask block being a binary complement of said first mask block and said second mask block being adapted to isolate said present set of spill-over bits from said present barrel-shifted block.

6. The method of claim 5, further comprising a second isolating step of logically applying said second mask block to said present barrel-shifted block to create a present isolated spill-over bits block.

7. The method of claim 6, wherein said storing step includes the step of storing said present isolated spill-over bits block in a history register.

8. The method of claim 7, wherein said combining step includes the steps of:

retrieving a previous isolated spill-over bits block from said history register; and adding said present isolated shifted bits block with said previous isolated spillover bits block.

9. The method of claim 8, wherein said steps of acquiring, barrel-shifting, first isolating, second isolating, storing, retrieving, combining, and dispatching are repeated for an entire scan-line of the bit-map data.

10. The method of claim 1, wherein said present block and said present registered block are sized 16 bits wide.

11. The method of claim 1, wherein: said present block and said present registered block are sized M number of bits wide;

said shift count is taken from an N number of least significant bits of said registration value; and said N number equals $\log_2(M)$.

12. The method of claim 11, wherein said registration value is a two's complement binary number having a polarity and a magnitude.

13. The method of claim 12, further comprising the steps of:

determining if said magnitude of said registration value is greater than M; and responsive to a determination that said magnitude of said registration value is greater than M, prior to said dispatching step, performing a padding step of dispatching at least one block of NULL bits to said print engine.

14. The method of claim 13, further comprising the step of repeating said acquiring, barrel-shifting, storing, combining, and dispatching steps until an equivalent of an entire scan-line of the bit-map data has been dispatched to said print engine.

15. The method of claim 14, further comprising the step of, subsequent to said repeating step, performing a clipping step of acquiring blocks of bit-map data from said stream until an equivalent of an entire scan-line of the bit-map data has been acquired from said stream.

16. The method of claim 13, wherein:

the number of blocks of NULL bits dispatched to said print engine during said padding step is determined by the value of a MULT bit-slice taken from said registration value; said MULT bit-slice comprising the bits between the most significant bit of said registration value and the N least significant bits of said registration value.

17. The method of claim 12, further comprising the steps of:

determining if said magnitude of said registration value is greater than M; and responsive to a determination that said magnitude of said registration value is greater than M, prior to said dispatching step, acquiring a next block of the bit-map data from said stream; and barrel-shifting said next block a number of bits according to said pre-determined shift count to create a next contiguous set of shifted bit-map data bits and a next contiguous set of spill-over bit-map data bits;

storing said next set of spill-over bits;

combining said next set of shifted bits with said present set of spill-over bits to create a next registered block of bit-map data; and overwriting said present registration block with said next registration block, thereby clipping said present registered block from the beginning of the scan-line.

18. The method of claim 17, further comprising the step of repeating said acquiring, barrel-shifting, storing, combining, and dispatching steps until an equivalent of an entire scan-line of the bit-map data has been acquired from said stream.

19. The method of claim 18, further comprising the step of, after said repeating step, performing a padding step of continuously dispatching blocks of NULL bits to said print engine until an equivalent of an entire scan-line has been dispatched to said print engine.

20. The method of claim 1, wherein said registration value is updated in response to an operator activating registration controls.

21. The method of claim 1, wherein said steps of acquiring, shifting, storing, combining, and dispatching are performed only by non-intelligent hardware devices.

22. The method of claim 21, wherein said non-intelligent hardware devices are positioned between a bit-map rendering section of a high-speed printer controller and said print engine.

23. The method of claim 1, further comprising the step of, responsive to a page detect signal being activated by an external sensor, waiting a predetermined period of time before performing said acquiring step.

24. The method of claim 23, further comprising the step of, responsive to a page detect signal being activated by said external sensor, waiting a predetermined period of time before performing said acquiring step, wherein said predetermined period of time is determined from a vertical registration value produced in response to said detection of misalignment.

25. The method of claim 24, wherein said vertical registration value and said horizontal registration value are updated in response to an operator activating registration controls.

26. The method of claim 25, wherein said horizontal registration value is a two's complement binary number indicative of the magnitude and direction of the horizontal registration.

* * * * *

UNITED STATES PATENT AND TRADEMARK OFFICE
CERTIFICATE OF CORRECTION

PATENT NO. : 5,760,914
DATED : June 2, 1998
INVENTOR(S) : Forrest P. Gauthier and Dimitrije L. Jovic It is certified that error appears in the above-indentified patent and that said Letters Patent is hereby corrected as shown below:

Claim 11, Col. 21, Line 6 - "log" should be --$\log_2$--.

Signed and Sealed this

Eighteenth Day of August, 1998

Attest:

BRUCE LEHMAN

Attesting Officer      Commissioner of Patents and Trademarks